United States Patent [19]

Polgreen

[11] Patent Number: 4,937,699

[45] Date of Patent: Jun. 26, 1990

[54] FREQUENCY DEPENDENT FUSE FOR A TELEPHONE CIRCUIT OR THE LIKE

[75] Inventor: Evelyn L. Polgreen, Evanston, Ill.

[73] Assignee: Illinois Tool Works, Inc., Chicago, Ill.

[21] Appl. No.: 172,297

[22] Filed: Mar. 23, 1988

[51] Int. Cl.[5] .............................................. H02H 3/087

[52] U.S. Cl. ...................................... 361/87; 361/119; 361/104

[58] Field of Search .................... 361/58, 91, 110, 111, 361/117, 56, 57, 87, 93, 118, 119, 126, 127, 104, 392, 354, 399; 379/412

[56] References Cited

U.S. PATENT DOCUMENTS 3,840,781 10/1974 Brown .................................. 361/58

3,924,175 1/1976 Clark ................................ 361/91 X 4,389,695 6/1983 Carpenter, Jr. .................. 361/91 X 4,424,546 1/1984 Smith ................................. 361/119

4,594,635 6/1986 Scheithauer et al. ............... 361/119

4,630,163 12/1986 Cooper et al. .................... 361/91 X 4,692,721 10/1987 Warren ........................... 361/119 X 4,692,833 9/1987 Chung ............................. 361/119 X

*Primary Examiner*—Derek S. Jennings

*Attorney, Agent, or Firm*—Schwartz & Weinrieb

[57] ABSTRACT

A sneak current protection device is disclosed including a series connected fuse, resistor and inductor for limiting the rate of current rise through the protective fuse whereby the fuse operates in compliance with all industry accepted standards for fire hazard and circuit protection.

15 Claims, 1 Drawing Sheet

FREQUENCY DEPENDENT FUSE FOR A TELEPHONE CIRCUIT OR THE LIKE

FIELD FOR THE INVENTION

This invention relates to an over-current protection device for a low voltage circuit. While not limited thereto, the invention relates to a sneak current protection device for a telephone circuit but can be adapted for use with, for example, other communication and data circuits.

BACKGROUND OF THE INVENTION

It is known that currents can be induced into such circuits due to, for example, lightning strikes, and crossing or contact, of low voltage lines with high voltage lines. Such induced currents can damage sensitive solid state components and accordingly must be protected against.

Presently, protection against sneak currents is typically provided by inserting a fuse element in at least one line and preferably both low voltage lines of the telephone or other equipment circuit. In some applications, the fuse provides primary protection and in other applications, the fuse is used in combination with other protection devices such as, for example, a gas tube and/or silicon avalanche suppressor type protectors which are primarily voltage protection devices. In that case, up to, for example, four fuses may be utilized.

In any case, present sneak current protectors suffer from a primary shortcoming in that they do not meet all proposed industry accepted standards for sneak current protectors and in particular those according to proposed Underwriters Laboratory tests UL1459 and UL497A. These proposed standards first require that the protection device function at up to 600 volts AC and up to 350 amperes. The also requires that the protector must function by opening the circuit at the designated voltage and current levels without the functioning of a standard fuse element provided within the test circuit. Furthermore, the protection device must function without conflagration, that is without risk of fire as also determined by certain specified objective test effects. As noted, there presently is no known sneak current protection device that complies with all proposed industry accepted standards and requirements.

SUMMARY OF THE INVENTION

According to the invention, there is provided a sneak current protection device that includes means for limiting the rate of current increase through a fuse element due to a current increase through the circuit in which the protection device is incorporated.

According to an important aspect of the invention, a frequency dependent element in the form of an inductor is connected in series with the fuse element of the protection device.

Accordingly, the inductor experiences a change in impedance dependent upon the rate of change of the frequency of the current passing through the inductor which limits the rate of current increase and slows the blow time of the fuse element.

According to an important embodiment, a resistor is also connected in series with the inductor and fuse element.

According to the invention, the frequency dependent circuit is mounted within an insulating housing provided with terminal connectors for connection with the low voltage circuit to be protected.

An important feature provides for the housing of the device to be internally partitioned into separate chambers or receptacles, each receptacle having one circuit element mounted therein.

A still further very important feature provides for a pair of connectors for connecting the resistor, inductor and fuse element in series.

BRIEF DESCRIPTION OF THE DRAWINGS

The invention will be better understood after reading the following Detailed Description of the Preferred Embodiment in conjunction with the drawings in which.

DETAILED DESCRIPTION OF THE PREFERRED EMBODIMENT

Figure 1:
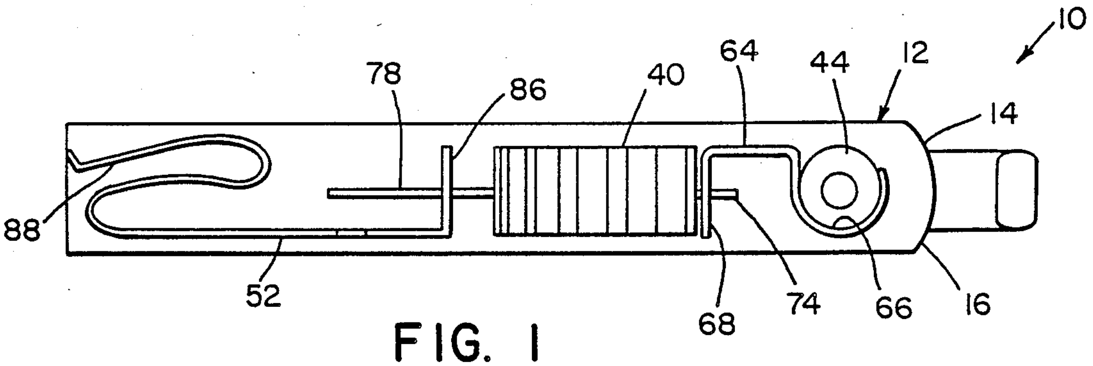
FIG. 1 is a side view of the protection device showing details of mounting the circuit elements.
Figure 2:
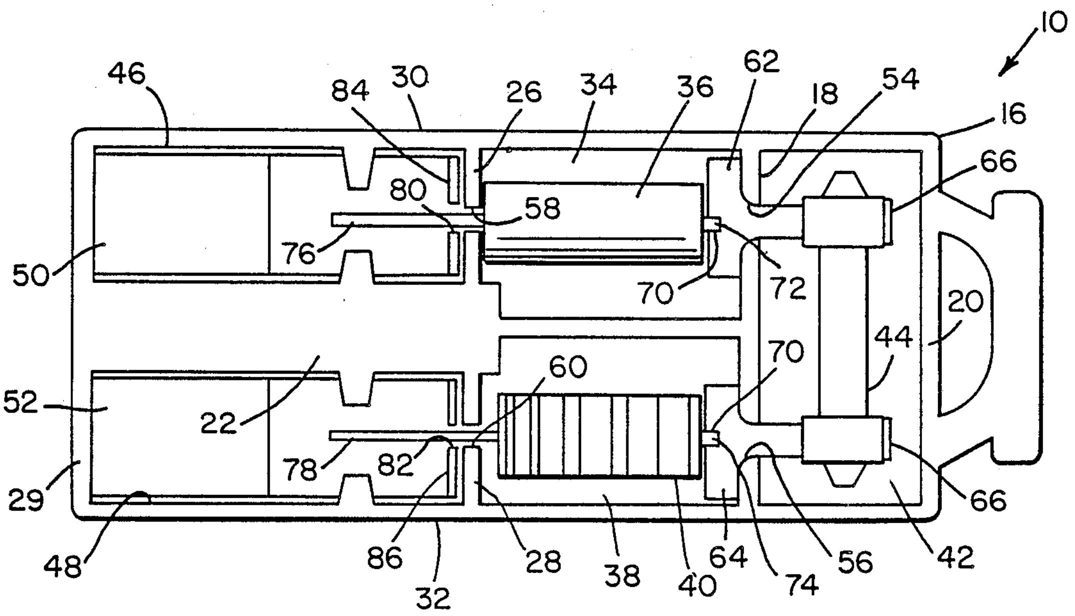
FIG. 2 is a top view of a protection device with the top half of the housing removed showing details of construction and the mounting of the circuit elements within the housing.

Shown in FIGS. 1 and 2 is a sneak current protection device 10 including an insulating plastic housing 12 made up of two halves 14, 16. The two halves preferably have identical constructions and are molded so as to include a partition arrangement such that when they are joined together, such as, for example, by means of sonic welding, a plurality of chambers or receptacles are formed.

As shown in FIG. 2, each housing half includes a transverse partition 18 proximate one end wall 20 and a central longitudinal partition 22 extending from the transverse partition 18 to the end wall 24. Two additional transverse partitions 26, 28 extend from the central longitudinal partition 22 to the opposing sidewalls 30, 32 respectively. Accordingly, each housing half is partitioned into complementary portions for forming five receptacles when the halves are joined together. A first receptacle 34 receives a resistor 36, a second receptacle 38 receives an inductor 40 and a third transverse chamber 42 has a fuse element 44 mounted therein. A fourth receptacle 46 and a fifth receptacle 48 each have one of a pair of terminal numbers 50, 52 mounted therein .

It can be seen that the receptacle pairs 34, 38 and 46, 48 are parallel to each other and disposed on opposite sides of the longitudinal axis of the housing. The receptacle pairs 34 ,46 and 38, 48 are longitudinally aligned.

The transverse partition wall 18 includes a pair of apertures 54, 56 respectively connecting the receptacles 34 and 38 to the transverse receptacle 42. A second pair of apertures 58, 60 are provided within the transverse partitions 26, 28 respectively and connect the receptacles 46, 48 to the receptacles 34, 38.

Electrically conductive connectors, 62, 64 extend through the apertures 54, 56 and electrically connect the resistor 36, the inductor 40 and the fuse 44 in series. Each connector 62, 64 includes oppositely directed generally U-shaped portions 66, 68. One portion 66 is configured to receive the fuse element 44 and the other portion 68 protrudes down into the respective portions of chambers 34, 38 in one housing half, the lower half 14 as viewed in the drawing, and includes a notch or slit 70 fractionally receiving and retaining a lead 72, 74 of the resistor and inductor, respectively. The leads 76, 78 disposed upon the opposite ends of the resistor and inductor extend respectively through the apertures 58, 60 and are secured to the terminals 50, 52 by means of a similar slot or slit 80, 82 provided within an upstanding leg portion 84, 86 of each terminal.

Each terminal includes a female connector 88 configured to receive a male terminal. The terminals 50, 52 are stamped or otherwise formed a well known manner from a resilient electrically conductive material into an S-shaped configuration so as to form the female connector.

Figure 3:
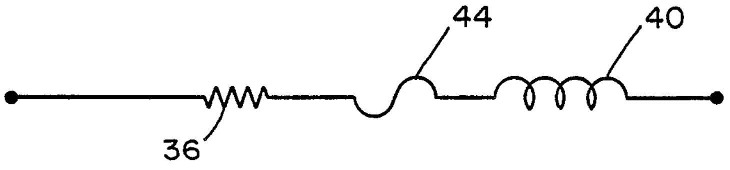
FIG. 3 is a circuit diagram of a frequency dependent protection circuit used in a protection device.

The series connected inductor 40, fuse 44 and resistor 36 form the sneak current protection circuit shown in FIG. 3. Since the inductor responds to a change in current passing through it over a period of time, in the event that a lightning strike or power line cross occurs, the impedance of the inductor increases due to the increase in rate of change of the current surge into the low voltage circuit, and accordingly, limits the rate of current rise which, for the reasons set out below, advantageously increases the blow time of the protective fuse. The preferred protection fuse 44 is a fuse rated at 600 volts DC and 350 milliamps. Although the value of the inductor can vary depending upon the application, the preferred inductor would be at least approximately 20 microhenries. Also, the resistor may not be required within all applications but when used, for example, in a telephone circuit, the resistor would have a value of approximately 16 ohms. The rate of change of the current in the circuit is less within the case of a power line cross than during a lightning strike but the increased impedance provided by means of the inductor in both situations still increases the blow time of the protective fuse.

This is advantageous for at least two principal reasons relating to the requirements of Underwriters Laboratory test procedure UL497A. First, even though the blow time of the standard fuse (a BUSSMAN MDX 1 6/10 fuse) designated by means of the test procedure is also increased, it has been found that the circuit according to the invention provides for an increase in the blow time of the standard BUSSMAN fuse sufficient to always insure that the protective fuse blows first. Accordingly, the protective fuse will always function (that is blow) without the standard test fuse blowing as required by the UL test. Second, by limiting the rate of current rise through the fuse 44 by means of the circuit of the present invention, operation of the protective fuse 44 occurs in compliance with the risk of fire standards of the test procedure. That is, the circuit of the present invention provides for the protection fuse 44 to blow "gracefully" and thus interrupt the circuit without risk of fire in accordance with the test standards and as noted at all times without the standard test fuse blowing, which has heretofore not been accomplished.

Having described the preferred embodiment of the present invention those skilled in the art can readily devise other embodiments and modifications. Accordingly, such other embodiments and modifications are to be considered to be within the scope of the appended claims.

What is claimed is:

1. A sneak current protection device for telephone circuits or the like, comprising:

a housing; and circuit means within said housing including fuse means for interrupting an electrical current flow through said circuit means at a predetermined level of said current flow, and means for delaying the increase of said current flow through said fuse means up to said predetermined level of said current flow as defined by said fuse means upon an increase in said current flow through said circuit.

2. The device as claimed in claim 1, wherein:

said means for delaying said increase of said current flow includes a frequency responsive element connected in series with said fuse means, the impedance of said frequency responsive element increasing with an increase in the rate of change of the current passing therethrough.

3. The device as claimed in claim 2 wherein said frequency responsive element is an inductor.

4. The device as claimed in claim 3 further including a resistor connected in series with said inductor and said fuse means.

5. The device as claimed in claim 3 wherein said fuse means is a fuse rated at approximately 600 volts DC and 350 milliamperes, and said inductor is rated at least approximately 20 microhenries.

6. The device as claimed in claim 4 wherein said fuse means is a fuse rated at approximately 600 volts DC and 350 milliamperes, said inductor is rated at approximately 20 microhenries and said resistor is rated at approximately 16 ohms.

7. A sneak current protection device for a telephone circuirt or the like, comprising:

a dielectric housing;

a terminal means mounted within said housing for serial connection to a power line of said telephone circuit or the like; and circuit means within said housing, and connected in series with said terminal means, including fuse means for interrupting an electrical current flow within said power line at a predetermined level of said current flow, and an inductor element for delaying the increase of said current flow through said fuse means up to said predetermined level of said current flow as defined by said fuse means upon an increase in said current flow through said power line, said fuse means and said inductor element being serially connected together and to said terminal means.

8. The device as claimed in claim 7 further including a resistor connected in series with said fuse means, said inductor element and said terminal means.

9. A sneak current protection device for a telephone circuit or the like, comprising:

an electrically insulating housing having at least three receptacles;

a resistor disposed within a first one of said receptacles;

an inductor disposed within a second one of said receptacles;

a fuse disposed within a third one of said receptacles;

a pair of connectors connecting said resistor, said inductor, and said fuse in series; and a pair of terminals mounted within said housing, said resistor, said inductor, and said fuse being connected in series between said pair of terminals, each of said pair of terminals including a female connector portion adapted to receive a male terminal;

said fuse being provided for interrupting an electrical current flow within a power line of said telephone circuit or the like at a predetermined level of said current flow, and said inductor being provided for delaying the increase of said current flow through said fuse up to said predetermined level of said current flow as defined by said fuse upon an increase in said currrent flow through said power line.

10. The device as claimed in claim 9 wherein one of said pair of terminals is mounted within a fourth receptacle provided within said hosing and the second one of said pair of terminals is mounted within a fifth receptacle provided in said housing.

11. The device as claimed in claim 10 wherein said housing comprises two halves secured together, each half including partition means subdividing each half into portions of said receptacles.

12. The device as claimed in claim 11 wherein said fourth receptacles and said fifth receptacles in which said pair of terminals are respectively mounted are transversely spaced apart and substantially parallel, said one and said second receptacles are transversely spaced apart and substantially parallel, said one receptacle longitudinally aligned with said fourth receptacle, said second receptacle longitudinally aligned with said fifth receptacle and said third receptacle is transverse to said one and said second receptacles.

13. The device as claimed in claim 12 wherein said partition means includes a first pair of apertures connecting said one receptacle to said third transverse receptacle and said second receptacle to said third transverse receptacle, each one of said pair of connectors extending through a respective one of said first pair of apertures, said partition means further including a second pair of apertures connecting said one receptacle to one of said fourth and fifth receptacles and connecting said second receptacle to the other one of said fourth and fifth receptacles.

14. The device as claimed in claim 13 wherein said second pair of apertures are adapted to pass a lead from said resistor and from said inductor into said fourth and fifth receptacles.

15. A sneak current protection device for a telephone circuit or the like, comprising:

an electrically insulating housing having at least two receptacles;

an inductor disposed within a first one of said receptacles;

a fuse disposed within a second one of said receptacles;

a pair of connectors connecting said inductor and said fuse in series; and a pair of terminals mounted within said housing, said inductor and said fuse being connected in series between said pair of terminals, and each of said pair of terminals including a female connector portion adapted to receive a male terminal;

said fuse being provided for interrupting an electrical current flow within a power line of said telephone circuit or the like at a predetermined level of said current flow, and said inductor being provided for delaying the increase of said current flow through said fuse up to said predetermined level of said current flow as defined by said fuse upon an increase in said current flow through said power line.

* * * * *